United States Patent
Willis

[15] 3,691,113
[45] Sept. 12, 1972

[54] EXPANDED CROSS-LINKED POLYMERS OF EPIHALOHYDRIN

[72] Inventor: William D. Willis, Limestone Acres, Del.

[73] Assignee: Hercules Incorporated, Wilmington, Del.

[22] Filed: Aug. 23, 1967

[21] Appl. No.: 662,577

Related U.S. Application Data

[63] Continuation-in-part of Ser. No. 550,622, May 17, 1966, which is a continuation-in-part of Ser. No. 341,728, Jan. 31, 1964, Pat. No. 3,287,287, which is a continuation-in-part of Ser. No. 261,189, Feb. 26, 1963, abandoned.

[52] U.S. Cl. ............260/2.5 R, 260/2 A, 260/2 XA, 260/37 EP, 260/37 R, 260/88.3 A
[51] Int. Cl. .................................................C08j 1/18
[58] Field of Search.................................260/2.5 EP

[56] References Cited

UNITED STATES PATENTS

| | | |
|---|---|---|
| 2,739,134 | 3/1956 | Parry et al.............260/2.5 EP |
| 2,831,820 | 4/1958 | Aase et al. ............260/2.5 EP |
| 3,026,270 | 3/1962 | Robinson..............260/2 EPA |
| 3,026,305 | 3/1962 | Robinson..............260/2 EPA |
| 3,058,921 | 10/1962 | Pannell.................260/2.5 EP |
| 3,154,504 | 10/1964 | Carey et al............260/2.5 EP |
| 3,287,287 | 11/1966 | Willis....................260/2.5 EP |

*Primary Examiner*—Murray Tillman
*Assistant Examiner*—Morton Foelak
*Attorney*—Marion C. Staves

[57] ABSTRACT

A foamed product comprising a cross-linked epihalohydrin polymer of substantially uniform closed-cell structure.

8 Claims, No Drawings

EXPANDED CROSS-LINKED POLYMERS OF EPIHALOHYDRIN

This application is a continuation-in-part of my copending application Ser. No. 550,622, filed May 17, 1966, which in turn is a continuation of my application Ser. No. 341,728, filed Jan. 31, 1964, now U.S. Pat. No. 3,287,287, which is in turn a continuation-in-part of my application Ser. No. 261,189, filed Feb. 26, 1963, now abandoned.

This invention relates to stable cross-linked poly(epihalohydrin) cellular products.

Epihalohydrin polymers and copolymers are comparatively new and possess a combination of properties which make them attractive for use in a diversity of applications. For example, in addition to having generally good overall physical properties, they have excellent swelling resistance in solvents and are outstanding in aging resistance, including outdoor exposure, ozone exposure and heat aging in air up to temperatures of at least 300° F.

It is known that high molecular weight polymers and copolymers of epihalohydrins can be vulcanized, i.e., cross-linked with various aliphatic and heterocyclic polyamines to produce rubbers that have the good attributes of a number of the so-called specialty rubbers and hence may be used as what might be termed a general purpose specialty rubber. In using these polyfunctional polyamine cross-linking agents, however, great care must be exercised to avoid scorching during the vulcanization of the polymer. Moreover, heretofore the polymers and copolymers of epihalohydrins have not been utilized for the preparation of stable expanded materials, although the combination of properties of poly(epihalohydrin) makes it attractive for such use.

It is an object of this invention, therefore, to provide stable, cross-linked poly(epihalohydrin) cellular products. Now, in accordance with this invention, it has been found that any high molecular weight polymer or copolymer of epihalohydrin can be vulcanized, i.e., cross-linked and blown, i.e., foamed, by heating the same in a confined spaced under pressure in the presence of a heat decomposable ammonium salt with or without a conventional blowing agent at a temperature above the decomposition temperature of said ammonium salt and blowing agent, when present, for a short period of time, then releasing the pressure and post-curing to complete the cross-linking of said polymer.

In the process of this invention it has been found that the ammonium salt decomposes to release ammonia, and cross-linking is effected by chemical reaction of the ammonia with the poly(epihalohydrin). This was most surprising, since it could not have been foreseen that the ammonium salt would lead to cross-linking, particularly since it is known that aliphatic primary monoamines alone are not cross-linking agents for polymers of epihalohydrins. Furthermore, the poly(epihalohydrin) compositions containing a heat decomposable ammonium salt are very resistant to scorch during the cross-linking and blowing operation, and the resulting cross-linked cellular products are substantially odorless.

For the preparation of stable, cross-linked, cellular poly(epihalohydrin) products in accordance with this invention, an epihalohydrin polymer or copolymer is initially blended with a heat decomposable ammonium salt, with or without a conventional blowing agent as necessary or desired, at a temperature below the decomposition temperature of said ammonium salt and said blowing agent when present, and the resulting blend is then subjected to a pressure cure of short duration in a confined space at a temperature above the decomposition temperature of said ammonium salt and of said blowing agent when present, to effect at least partial cross-linking and expansion of the polymer. Thereafter pressure is released and the resulting partially cross-linked, expanded polymer is subjected to a post-cure to complete the cross-linking of said polymer.

It has been found that ammonium salts such as ammonium carbonate, ammonium bicarbonate, ammonium carbamate, and mixtures thereof in any proportion, decompose upon heating to release both ammonia and carbon dioxide, and therefore combine the functions both of cross-linking agents and of blowing agents. When such ammonium salts are employed, cross-linked, expanded poly(epihalohydrin) products can be prepared without the use of any auxiliary conventional blowing agent. However, an auxiliary blowing agent may be employed, if desired. On the other hand, ammonium salts such as ammonium acetate, ammonium arsenate, ammonium borate, and the like function only as cross-linking agents, and require employment of a conventional blowing agent in order to prepare cross-linked expanded poly(epihalohydrin) products in accordance with this invention.

The cross-linked poly(epihalohydrin) expanded products of this invention are stable, closed cell materials, varying from spongelike to semi-rigid, depending on the degree of blowing and the specific polymer used. In general, they will have densities within the range from about 8 pounds per cubic foot to about 80 pounds per cubic foot, preferably from about 20 pounds per cubic foot to about 75 pounds per cubic foot, percentage compressability (determined with a one pound weight on a square inch of sample) of from about 20 percent to about 97 percent, and retain all of the characteristic desirable properties of the basic poly(epihalohydrin)s from which they are formed, including, in addition to good overall physical and mechanical properties, excellent swelling resistance to solvents, and outstanding aging resistance, including outdoor exposure, ozone exposure, and heat aging up to temperatures of at least 300° F.

In preparing the products of this invention, it is both convenient and practical to work the desired amount of ammonium salt and blowing agent, when used, into a poly(epihalohydrin) on a differential two-roll mill, or in a Banbury mixer, or other equivalent malaxating equipment at any convenient temperature below the decomposition temperature of the ammonium salt and blowing agent, when used. Similarly, any desired conventional compounding ingredients such as pigments, extenders, fillers, flame-proofing agents, plasticizers, antioxidants, stabilizers, anti-sticking agents, lubricating agents, etc., in any desired amounts are also blended into the polymer on the two-roll mill, or equivalent malaxating equipment.

For the production of the cross-linked, blown products, of this invention, the blend of epihalohydrin polymer and ammonium salt, with or without a conventional blowing agent, and with or without conventional compounding ingredients, is subjected to a pressure cure of short duration above the decomposition of the ammonium salt and of conventional blowing agent (when used) to effect at least partial cross-linking and expansion of the polymer. This pressure cure of short duration is ordinarily carried out in a closed mold of the desired configuration under pressure at temperatures from about 280° F. to about 375° F., preferably from about 300° F. to about 325° F., for a short time interval within the range from about two minutes to about 10 minutes, preferably from about three minutes to about five minutes, at pressures between about 250 pounds per square inch and about 2,000 pounds per square inch, preferably between about 400 pounds per square inch and about 900 pounds per square inch.

During this pressure cure of short duration, substantially all of the blowing the polymer takes place, as well as a major part of the cross-linking of the polymer, at least sufficient to stabilize the closed-cell structure of the blown polymer and prevent rupture of said closed-cell structure upon release of pressure.

Following the pressure cure of short duration, pressure is released, and the partially cross-linked, blown polymer is then subjected to a post-curing operation at atmospheric pressure to complete the cross-linking. It has been observed that in the case of elastomeric polymers the elastic properties of post-cured blown elastomeric compositions of this invention are usually improved over the elastic properties of the blown compositions prior to post-curing.

Temperatures employed during the post-curing are generally on the order of about 280° F. to about 350° F., preferably about 290° F. to about 310° F., and the duration of the post-curing operation may vary from about 10 minutes to about one hour, preferably from about 10 minutes to about 30 minutes. Post-curing of the blown compositions may be accomplished by any convenient means, such as, for example, conventional hot air or hot gas ovens or tunnels, radiant heat sources, such as infrared lamps or incandescent heating elements, etc.

Any high molecular weight polymer of an epihalohydrin, including amorphous, crystalline, isotactic, etc. polymers of epihalohydrin, is suitable for the purposes of this invention. Such polymers may be homopolymers prepared by polymerizing any monomeric epihalohydrin, e.g., epifluorohydrin, epichlorohydrin, epibromohydrin, or epiiodohydrin. They may also be copolymers in which the repeating units are derived from mixtures in any proportion of two or more molecular species of monomeric epihalohydrins, such as, for example, mixtures of epichlorohydrin and epibromohydrin, or mixtures of epibromohydrin, epifluorohydrin, and epiiodohydrin. They may also be copolymers of epihalohydrins with one or more other epoxides in which a major amount of the repeating units, e.g., at least about 50 percent by weight, are derived from epihalohydrins, such as, for example, a copolymer of propylene oxide and epichlorohydrin. The polymer may be essentially wholly amorphous, a mixture of amorphous and crystalline polymers, or essentially completely crystalline. Generally, the amorphous polymers provide the most rubbery products. However, excellent rubbery products are obtained from expandable compositions of mixtures of amorphous and crystalline polymers. In this case, the amount of the crystalline polymer is generally less than about 25 percent to 30 percent by weight of the mixture.

The epihalohydrin polymers of this invention are essentially linear polyethers in which polymerization, at least in major part, has taken place through the epoxide linkage so that the polymer contains halomethyl groups attached to the main polymer chain. The homopolymers are believed to have the following general formula:

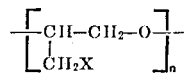

in which X is halogen and n is a numeral designating the number of repeating units in the polymer. In the same way, when an epihalohydrin is copolymerized with one or more other epoxides (including other epihalohydrins) polymerization takes place through the epoxide linkage even though other polymerizable groups may be present, and it is apparent that such copolymers also contain halomethyl groups attached to the main polymer chain.

Typical of other epoxides that can be copolymerized with epihalohydrins to produce the polymers used in this invention include, by way of example, the alkylene oxides such as ethylene oxide, propylene oxide, butene-1 oxide, cis and trans butene-2 oxides, hexene-1 oxide, hexene-2 oxide, dodecene-1 oxide, iso-butylene epoxide, and the like; cycloaliphatic epoxides such as cyclohexene oxides, vinyl cyclohexene oxides (both mono- and di- oxides), α-pinene epoxide, dipentene epoxide, and the like; epoxy ethers such as ethyl glycidyl ether, isopropyl glycidyl ether, tert-butyl glycidyl ether, phenyl glycidyl ether, chlorophenyl glycidyl ether, 2-chloroethyl glycidyl ether, ethylphenyl glycidyl ether, vinyl glycidyl ether, allyl glycidyl ether, methallyl glycidyl ether, vinyl cyclohexyl glycidyl ether, o-allylphenyl glycidyl ether, p-vinylbenzyl glycidyl ether, and the like; ethylenically unsaturated glycidyl esters such as glycidyl crotonate, glycidyl oleate, glycidyl methacrylate, and the like; and other epoxides such as, for example, styrene oxide, α-methylstyrene oxide, butadiene monoxide, butadiene dioxide, epoxy stearates, 3,4-epoxy-1-pentene, 3,4-epoxy-1-vinylcyclohexene, divinylbenzyl monoxide, and the like.

The epihalohydrin polymers used in this invention are characterized by having a weight average molecular weight of at least about 40,000 and preferably at least about 100,000. Molecular weights of this order usually correspond to reduced specific viscosity, $\eta sp/C$, of at least about 0.2 and preferably at least about 0.5. Reduced specific viscosities are generally determined on solutions of the polymers at 0.1 percent concentration in $\eta$-chloro-naphthalene at 100° C., although polymers high in epifluorohydrin content are preferably determined on solutions thereof at 0.1 percent concentration in cyclohexanone at 50° C.

In the expression $\eta sp/C$ for defining reduced specific viscosity, the symbol $\eta sp$ stands for specific viscosity and the symbol O stands for concentration of the polymer in the solution thereof in solvent expressed as grams per 100 ml. of solution. Specific viscosity, $\eta sp$, is obtained by dividing the difference between the viscosity of the polymer solution and the viscosity of the solvent used therein by the viscosity of the solvent.

The epihalohydrin polymers used in this invention can be prepared by contacting an epihalohydrin monomer, a mixture of epihalohydrin monomers, or a mixture of one or more epihalohydrin monomers and one or more other epoxide monomers with a catalyst formed by reacting an organoaluminum compound with from about 0.1 mole to about 1.5 moles of water per mole of organoaluminum compound. They may also be prepared by contacting a monomeric epihalohydrin, a mixture of monomeric epihalohydrins, or a mixture of one or more monomeric epihalohydrins and one or more other monomeric epoxides with a catalyst formed by reacting an organoaluminum compound with from about 0.01 mole to about 2 moles of a chelating agent such as acetylacetone, benzoylacetone, aceto-acetic acid, ethyl glycolate, oxalic acid, glyoxal monoxime, etc., and with from about 0.1 mole to about 1.5 moles of water per mole of organoaluminum compound. Exemplary of organoaluminum compounds that can be so reacted with chelating agent and/or with water and used as the catalyst are triethylaluminum, triisobutylaluminum, diethylaluminum hydride, etc. The amount of such catalyst will generally be in the range from about 0.2 to about 10 mole per cent based on the weight of monomers being polymerized, preferably from about 1 to about 5 mole per cent.

The polymerization reaction is generally carried out in the presence of an inert, liquid, organic diluent, but can be carried out in an essentially bulk polymerization process. Suitable diluents that can be used for the polymerization are the ethers, hydrocarbons, halogenated hydrocarbons, and mixtures of such diluents. The temperature of the polymerization process can be varied over a wide range, generally from about −80° C. to about 250° C., and while atmospheric pressure is usually used, the pressure can be varied from subatmospheric up to several atmospheres.

Any of the well-known chemical blowing agents can be used in the preparation of the cross-linked, expanded products of this invention. Exemplary of the chemical blowing agents are azo bis (formamide), diazaminobenzene, N,N'-dinitrosopentamethylene tetramine, N,N'-dimethyl-N,N'-dinitrosoterephthalamide, p,p'-oxy-bis (benzene sulfonyl semicarbazide), azo bis (isobutyronitrile), p,p'-oxy-bis(benzene sulfonyl hydrazide), p,p'-diphenyl-bis(sulfonyl hydrazide), benzene-sulfonyl hydrazide, m-benzene-bis(sulfonyl hydrazide), and the like. The well-known solvent blowing agents such as butane, hexane, chloroform, trichloroethylene, monochlorotrifluoromethane, monochlorodifluoromethane, dichlorotetrafluoroethylene, and the like can also be used. In short, any compound which decomposes to yield at least one mole of gas per mole of blowing agent at a temperature of about 375° F. or less can be used.

The amount of such conventional blowing agent will ordinarily be used in an amount up to about 10 percent, based on the weight of elastomeric epihalohydrin polymer employed, and preferably in an amount between about 2 percent and about 5 percent, based on polymer weight.

Any ammonium salt which thermally decomposes to release ammonia at temperatures below about 375° F. is effective for accomplishing cross-linking of epihalohydrin polymers for the purposes of this invention. Such ammonium salts may be either salts of organic acids or salts of inorganic acids. Some typical ammonium salts of organic acids include, by way of example, ammonium carbonate, ammonium bicarbonate, ammonium carbamate, ammonium formate, ammonium acetate, ammonium propionate, ammonium citrate, ammonium tartrate, ammonium acid tartrate, ammonium thiocyanate, ammonium cyanate, and the like. Some typical ammonium salts of inorganic acids include, by way of example, ammonium metaantimonate, ammonium arsenate, diammonium monohydrogen arsenate, monoammonium dihydrogen arsenate, ammonium borate, ammonium chloroalladate, ammonium chloroplatinate, ammonium chloroplumbate, ammonium chromate, ammonium dichromate, ammonium dithionate, ammonium fluoride, ammonium iodate, ammonium molybdate, ammonium persulfate, ammonium phosphomolybdate, ammonium selenate, ammonium thiosulfate, etc., and mixtures of such thermally decomposable ammonium salts in any proportion. Obviously, of course, ammonium salts which decompose with explosive violence, such as, for example, ammonium chlorate, ammonium nitrite, ammonium permanganate, ammonium periodate, etc., are not contemplated for the purposes of this invention.

The amount of ammonium salt will depend somewhat on the degree of elasticity desired, as well as on the density desired in the final product, and will be at least sufficient to stabilize the closed-cell structure of the blown product and prevent rupture of the closed-cell structure of the final blown composition. Generally, however, an amount of ammonium salt from about 0.5 percent to about 10 percent, and preferably from about 1 percent to about 5 percent by weight of the poly(epihalohydrin) may be employed for the purposes of this invention.

This invention contemplates employing any of the numerous host of conventional pigments, fillers, extenders, plasticizers, flame-proofing agents, lubricating and anti-sticking agents, anti-oxidants, etc., commonly employed in the art, in any desired combination of such modifying adjuvants, and in any desired proportion thereof, in preparing the cross-linked poly(epihalohydrin) cellular products of this invention. However, the presence or absence of such adjuvant is immaterial to the invention.

The general nature of the invention having been set forth, the following examples illustrate some specific embodiments of the invention. It is to be understood, however, that the invention is in no way limited to the examples, since this invention may be carried out by the use of various modifications and changes within the scope of the invention as herein set forth and described. All parts in the following examples are by weight, unless otherwise specified.

EXAMPLE 1

100 parts of an elastomeric homopolymer of epichlorohydrin having a reduced specific viscosity of 1.6, as measured on a 0.1 percent by weight solution of the elastomer in α-chloronaphthalene at 100° C., was placed on a differential two-roll mill with the front roll maintained at 60° F. with circulating cold water and the back roll maintained at room temperature, and was worked on the mill. 2 parts of ammonium carbonate, 1 part of polymerized trimethyl dihydroquinoline, 5 parts of white lead, and 50 parts of fast extrusion furnace carbon black were intimately admixed into the elastomer by working on the mill at the above roll temperatures. The resulting compounded composition was then sheeted from the mill and was allowed to stand overnight prior to curing. This composition had a density of 94 pounds per cubic foot. Mooney scorch measurements were made on this composition at 250° F. in accordance with ASTM D 1646.

The sheeted composition was then cut to fit the cavities (1 inch × 2 inches × 0.060 inch) of a multi-cavity compression type aluminum mold, and was pressure cured in the preheated mold for three minutes at 310° F. under a pressure of 900 pounds per square inch. The pressure was then released from the mold, and examination showed that the resulting cross-linked specimens were expanded to approximately twice the thickness of the mold cavity, and were of substantially closed-cell structure. One specimen was subjected to gel-swell measurement by immersion in toluene for four hours at 80° C. The remaining specimens were then given a post-cure in an air oven at atmospheric pressure for 20 minutes at 300° F. Examination showed that the resulting post-cured specimens retained both a substantially closed-cell structure and the blown dimensions obtained in the pressure cure, had a density of 48 pounds per cubic foot and a percentage compressibility of approximately 72 percent (determined with a one pound weight on a square inch of sample). They were strong, highly elastic and substantially odorless. The postcured specimens were evaluated at room temperature for modulus at 100 percent elongation, tensile strength, elongation at break, Shore A2 hardness, and break set. A post-cured specimen was also subjected to gel-swell measurement by immersion in toluene for four hours at 80° C. The following table gives the results of the test data obtained.

| | |
|---|---|
| Mooney Scorch at 250°F. (ASTM D 1646), Minutes to 5-point Rise | 20 |
| Modulus at 100% Elongation, Pounds per square inch | 240 |
| Tensile Strength, Pounds per square inch | 495 |
| Elongation at Break, Percent | 175 |
| Shore A2 Hardness | 28 |
| Break Set, Percent | 0 |
| Gel-Swell Data (4 hours at 80°C. in toluene), Specimen given pressure cure only | |
| Weight Percent Gel | 85 |
| % Swell | 315 |
| Specimen given both Pressure Cure and Post-Cure | |
| Weight Percent Gel | 88 |
| % Swell | 315 |

The above properties indicate that the expanded product would be useful as thermal insulation.

EXAMPLE 2

One hundred (100) parts of an elastomeric copolymer of epichlorohydrin and propylene oxide containing 83 percent by weight of epichlorohydrin and 17 percent by weight of propylene oxide, and having a reduced specific viscosity of 12.9, as measured on a 0.1 percent by weight solution of the elastomer in α-chloronaphthalene at 100° C. was placed on a two-roll mill with the front roll maintained at about 140° F. and the back roll maintained at about 150° F., and allowed to band. 25 parts of fast extrusion furnace carbon black was then incorporated into the elastomer on the mill, followed by the addition of 1.5 parts of a primary amine derived from a tallow fatty acid. An additional 25 parts of fast extrusion furnace carbon black was then incorporated into the elastomer, followed by the addition of 1 part of polymerized trimethyl dihydroquinoline, 5 parts of white lead, and 3 parts of ammonium carbonate, and the above ingredients were intimately admixed with the elastomer by working the composition on the mill at the above roll temperatures. The resulting compounded composition was sheeted from the mill, and was cut into specimens to fit the cavities (1 inch × 2 inches × 0.06 inch) of a multi-cavity compression type aluminum mold.

A portion of the specimens were pressure cured in the preheated mold for three minutes at 310° F. under a pressure of 900 pounds per square inch, whereupon pressure was released from the mold, and examination showed that the specimens were cross-linked and expanded, having a substantially closed-cell structure. These partially cured specimens were then given a post-cure in an air oven at atmospheric pressure for 20 minutes at 300° F. The post-cured specimens had a density of 38.7 pounds per cubic foot, a percentage compressibility of approximately 89 percent (determined with a one pound weight on a square inch of sample), retained a substantially closed-cell structure, and were strong, highly elastic and substantially odorless.

Another portion of the specimens were pressure cured in the preheated mold for four minutes at 310° F. under a pressure of 900 pounds per square inch, whereupon pressure was released from the mold, and examination showed that the specimens were cross-linked and expanded, having a substantially closed-cell structure. These partially cured, expanded specimens were then given a post-cure in an air oven at atmospheric pressure for 20 minutes at 300° F. The post-cured specimens had a density of 74.2 pounds per cubic foot, a percentage compressibility of approximately 39 percent (determined with a one pound weight on a square inch of sample), retained a substantially closed-cell structure, and were strong, highly elastic and substantially odorless. These specimens and those above both have excellent vibration insulation properties.

Another portion of the specimens were pressure cured in the preheated mold for 45 minutes at 310° F. under a pressure of 900 pounds per square inch. The pressure was then released from the mold, and the resulting specimens were found to be well cured, having a uniformly dense structure, free of porosity, and having a density of 86.8 pounds per cubic foot, a percentage compressibility of less than 2 percent (determined with a one pound weight on a square inch of sample), and were strong, highly elastic and substantially odorless.

EXAMPLE 3

Following substantially the same procedure set forth in Example 2, a composition containing 100 parts of an elastomeric homopolymer of epichlorohydrin having a reduced specific viscosity of 1.6, as measured on a 0.1 percent by weight solution of the elastomer in $\alpha$-chloronaphthalene at 100° C., 50 parts of fast extrusion furnace carbon black, 1.5 parts of a primary amine derived from a tallow fatty acid, 1 part of polymerized trimethyl dihydroquinoline, 5 parts of white lead, 2 parts of ammonium carbonate, and 5 parts of p,p'-oxy-bis(benzene sulfonyl hydrazide) was compounded on the same two-roll mill. The p,p'-oxy-bis(benzene sulfonyl hydrazide) was the last ingredient incorporated into the composition. The composition after sheeting from the mill was cut into specimens for molding, as set forth in Example 2, and the same molding procedure set forth in Example 2 was followed.

The specimens given the three minute pressure cure were cross-linked and expanded, having a substantially closed-cell structure with a density of 36.2 pounds per cubic foot and a percentage compressibility of approximately 92 percent (determined with a one pound weight on a square inch of sample).

The specimens given the four minute pressure cure were cross-linked and expanded having a substantially closed-cell structure with a density of 41.8 pounds per cubic foot and a percentage compressibility of approximately 80 percent (determined with a one pound weight on a square inch of sample).

The specimens given the 45 minute pressure cure were well cured, having a uniformly dense structure free of porosity with a density of 95.5 pounds per cubic foot and a percentage compressibility of less than 2 percent (determined with a one pound weight on a square inch of sample).

All cured specimens were strong, highly elastic and substantially odorless. The specimens given three minute and four minute pressure cures made excellent floats for gasoline tanks. The specimen given the 45 minute pressure cure would not float.

EXAMPLE 4

Following substantially the same procedure set forth in Example 3, a composition containing 100 parts of the same elastomeric homopolymer of epichlorohydrin used in Example 3, 50 parts of fast extrusion furnace carbon black, 1.5 parts of a primary amine derived from a tallow fatty acid, 1 part of polymerized trimethyl dihydro-quinoline, 5 parts of white lead, 2 parts of ammonium acetate, and 5 parts of p,p'-oxy-bis(benzene sulfonyl hydrazide) was compounded on the same two-roll mill. After sheeting from the mill, the composition was cut into specimens for molding, as set forth in Example 2.

A portion of the specimens were pressure cured in the mold for four minutes at 310° F. under a pressure of 900 pounds per square inch, whereupon pressure was released from the mold, and examination showed that the specimens were cross-linked and expanded, having a substantially closed-cell structure. These partially cured, expanded specimens were then given a post-cure in an air oven at atmospheric pressure for 20 minutes at 300° F. The post-cured specimens had a density of 31.2 pounds per cubic foot, a percentage compressibility of approximately 96 percent (determined with a one pound weight on a square inch of sample), retained a substantially closed-cell structure, and were strong, highly elastic and substantially odorless.

Another portion of the specimens were pressure cured in the mold for six minutes at 310° F. under a pressure of 900 pounds per square inch, whereupon the pressure was released from the mold, and examination showed that the specimens were cross-linked and expanded, having a substantially closed-cell structure.

These partially cured, expanded specimens were then given a post-cure in an air oven at atmospheric pressure for 20 minutes at 300° F. The post-cured specimens had a density of 40.6 pounds per cubic foot, a percentage compressibility of approximately 80 percent (determined with a one pound weight on a square inch of sample), retained a substantially closed-cell structure, and were strong, highly elastic and substantially odorless.

Another portion of the specimens were pressure cured in the mold for 10 minutes at 310° F. under a pressure of 900 pounds per square inch, whereupon pressure was released from the mold, and examination showed that the specimens were cross-linked and expanded, having a substantially closed-cell structure.

These partially cured, expanded specimens were then given a post-cure in an air oven at atmospheric pressure for 20 minutes at 300° F. The post-cured specimens had a density of 66.8 pounds per cubic foot, a percentage compressibility of approximately 61 percent (determined with a one pound weight on a square inch of sample), retained a substantially closed-cell structure, and were strong, highly elastic and substantially odorless.

Another portion of the specimens were pressure cured in the mold for 45 minutes at 310° F. under a pressure of 900 pounds per square inch. The pressure was then released from the mold, and the resulting specimens were found to be well cured, having a uniformly dense structure free of porosity, and having a density of 95.5 pounds per cubic foot, a percentage compressibility of less than 2 percent (determined with a one pound weight on a square inch of sample), and were strong, highly elastic and substantially odorless.

The specimens given 4, 6 and 10 minute pressure cures had excellent acoustical insulation properties, while the specimen given a 45 minute pressure cure had essentially no ability to deaden sound.

EXAMPLE 5

One hundred (100) parts of an essentially completely isotactic (crystalline) homopolymer of epichlorohydrin having a reduced specific viscosity of 5.4, as determined in $\alpha$-chloro-naphthalene at 100° C., was placed on a differential two-roll mill with the front and back rolls maintained at 180° F. 2 parts of ammonium acetate, 1 part of polymerized trimethyl dihydroquin-oline, 5 parts of white lead, and 5 parts of p,p'-oxy-bis(benzene sulfonyl hydrazide) were intimately admixed into the polymer by working on the mill at the above roll temperatures. The resulting compounded composition was then sheeted from the mill and was allowed to stand overnight prior to curing. The sheeted composition was then cut to fit the cavities (1 inch × 2 inches × 0.06 inch) of a multi-cavity compression type aluminum mold and was pressure cured in the preheated mold for 17 minutes at 310° F. under a pressure of 900 pounds per square inch. The pressure was then released from the mold and examination showed that the resulting cross-linked specimens were expanded to approximately twice the thickness of the mold cavity and were of substantially closed-cell structure. A specimen of the flexible, semi-rigid, cellular material was subjected to gel-swell measurement by immersion in cyclohexanone for four hours at 80° C. The material had a percentage compressibility of approximately 20 percent (determined with a one pound weight on a square inch of sample), a per cent gel of 91 and a per cent swell of 1,431. The expanded, semi-rigid material of this example had excellent shock absorbing qualities and is useful in the manufacture of crash pads, helmet liners, etc.

It will be apparent from the foregoing description that this invention represents an important advance and contribution to the art of expanded materials. The expanded products of this invention are useful in a wide variety of applications, such as, for example, resilient "sponge" material for mattresses, pillows, furniture padding, and the like; as packing around delicate apparatus, instruments, and the like to absorb shock during transport, etc.; for thermal insulation or deadening sound; for semi-rigid foam; for floats in gasoline tanks, automobile carburetors and the like; etc.

What I claim and desire to protect by Letters Patent is:

1. Expanded cross-linked poly(epihalohydrin) of substantially uniform closed-cell structure, having a density of from about 8 pounds per cubic foot to about 75 pounds per cubic foot and a percentage compressibility of from about 20 percent to about 97 percent, said poly(epihalohydrin) having a weight average molecular weight of at least about 40,000.

2. The product of claim 1 in which the poly(epihalohydrin) is a homopolymer of an epihalohydrin.

3. The product of claim 2 in which the poly(epihalohydrin) homopolymer is substantially amorphous.

4. The product of claim 2 in which the poly(epihalohydrin) homopolymer is substantially crystalline.

5. The product of claim 2 in which the poly(epihalohydrin) is a homopolymer of epichlorohydrin.

6. The product of claim 1 in which the density is from about 20 pounds per cubic foot to about 75 pounds per cubic foot.

7. The product of claim 1 in which the poly(epihalohydrin) is a copolymer of an epihalohydrin and at least one other epoxide, said copolymer containing at least about 50 percent by weight of said epihalohydrin.

8. The product of claim 7 in which the poly(epihalohydrin) is a copolymer of epichlorohydrin and propylene oxide containing at least about 50 percent by weight of epichlorohydrin.

* * * * *

PO-1050
(5/69)

UNITED STATES PATENT OFFICE
CERTIFICATE OF CORRECTION

Patent No. 3,691,113     Dated September 12, 1972

Inventor(s) William D. Willis (Case 8-6-11-12)

It is certified that error appears in the above-identified patent and that said Letters Patent are hereby corrected as shown below:

Col. 4, line 67 of printed patent;

" n-chloro-naphthalene"     should be

-- α-chloro-naphthalene --

Col. 5, line 5 of printed patent;

" o "     should be     -- c --

Signed and sealed this 30th day of January 1973.

(SEAL)
Attest:

EDWARD M. FLETCHER, JR.     ROBERT GOTTSCHALK
Attesting Officer     Commissioner of Patents